United States Patent [19]
Nordby

[11] 4,124,885
[45] Nov. 7, 1978

[54] OFFSET COMPENSATION FOR HARMONIC NEUTRALIZED STATIC AC GENERATOR

[75] Inventor: Craig J. Nordby, Cheektowaga, N.Y.

[73] Assignee: Westinghouse Electric Corp., Pittsburgh, Pa.

[21] Appl. No.: 780,612

[22] Filed: Mar. 23, 1977

[51] Int. Cl.² .......................................... H02M 1/18
[52] U.S. Cl. ....................................... 363/56; 363/98
[58] Field of Search ................................. 363/55–58, 363/96–98

[56] References Cited
U.S. PATENT DOCUMENTS

| | | | |
|---|---|---|---|
| 3,697,855 | 10/1972 | Kernick et al. | 363/56 X |
| 3,859,583 | 1/1975 | Reed | 363/26 |

Primary Examiner—William M. Shoop
Attorney, Agent, or Firm—C. M. Lorin

[57] ABSTRACT

In an inverter system using parallel transformers to generate a reconstructed sinewave by harmonic neutralization method direct current offset in any of the transformers is eliminated by shifting one edge of one of the square pulses logically determining the conduction angle of the inverter.

A Hall device mounted in an auxiliary reactor connected with the primary of the transformer is used to sense flux conditions during sampling periods which are in time relation with the logic period in the control of the inverter system and the detected flux asymmetry is used to control the ON-OFF ratio of such logic period thereby to compensate for the offset.

5 Claims, 17 Drawing Figures

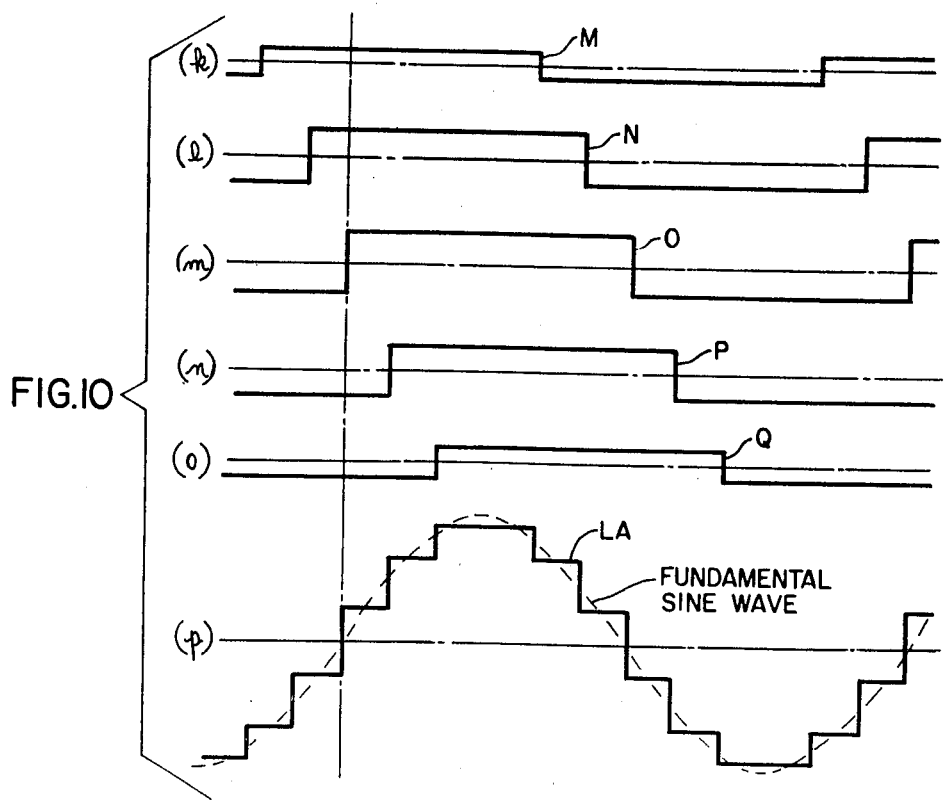
FIG.10
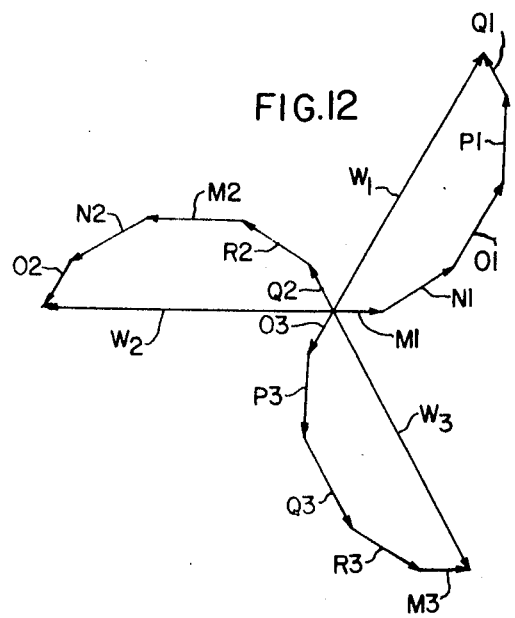
FIG.11
| TRANSFORMER | WINDING | RELATIVE RATED VOLTAGE |
|---|---|---|
| TM | T1 | $\sqrt{3}$ |
| TM | T2 | $2\sqrt{3}$ |
| TM | T3 | $\sqrt{3}$ |
| TN | T1 | 3.0 |
| TN | T2 | 3.0 |
| TO | T1 | $2\sqrt{3}$ |
| TO | T2 | $\sqrt{3}$ |
| TO | T3 | $\sqrt{3}$ |
| TP | T1 | 3.0 |
| TP | T3 | 3.0 |
| TQ | T1 | $\sqrt{3}$ |
| TQ | T2 | $\sqrt{3}$ |
| TQ | T3 | $2\sqrt{3}$ |
| TR | T2 | 3.0 |
| TR | T3 | 3.0 |
FIG.12

4,124,885

OFFSET COMPENSATION FOR HARMONIC NEUTRALIZED STATIC AC GENERATOR

BACKGROUND OF THE INVENTION

The invention relates to an inverter system using a transformer to generate a sinusoidal wave by harmonic neutralization, and proposes to eliminate direct current offset in the transformer which would tend to saturate the same.

The invention is applicable to variable speed alternating current motor drives of the type which is controlled statically to provide a controlled variable frequency power supply from a direct current source. Such technique basically rests on controlled conduction of power rectifiers such as thyristors. A sinusoidal waveform is reconstructed from a predetermined number of square pulses of voltage having selected magnitudes. This technique called "harmonic neutralization" is described in U.S. Pat. No. 3,491,282 of T. M. Heinrich et al., entitled "Static Inverter Wherein A Plurality Of Square Waves Are So Summed As To Produce A Sinusoidal Output Wave." The technique consists in generating with inverters a plurality of pulses at the fundamental frequencies and of same amplitude spaced from each other between stages of inverters by the same electrical angle. The pulses are amplified by respective stage transformers having winding ratios which follow the cosine law from one transformer to the other. The secondary windings are connected in series so as to sum up the dimensioned pulses and a polyphase output waveform is obtained by vector addition of transformer secondary voltages. Adjustment of the conduction angle, e.g., of the width of the outputted dimensioned squarewaves appearing in the primaries of the dimensioning transformers is used for voltage control and it has been shown that, for the practical range of voltage control with such a method the quality of the constructed sinusoidal wave is not lost.

Since the thyristors are cyclically turned ON and OFF, the operation of the inverter normally causes a periodic and symmetrical change of the flux in the core of the transformer. In fact, discrepancies might occur in the timing of the power switches, in the characteristics of the components and SCR's of the inverter system. The inverter system includes a plurality of inverters each coupled at the output with a transformer, and such dissymmetries appear at the primary as direct current levels. Such direct current levels, or offset, in the transformer, will cause the latter to saturate after several cycles and coupling with the load will be lost. The result will be an overload of the inverter.

The object of the present invention is to provide for an automatic cancellation of any direct current offset appearing in the transformer at the output of an inverter.

SUMMARY OF THE INVENTION

Automatic cancellation of a direct current offset in a transformer at the output of an inverter is obtained by altering the control pattern of the inverter thyristors so so to introduce a controlled pattern asymmetry which substantially compensates for the inherent asymmetry causing the undesired direct current offset. Preferably, such control pattern asymmetry is obtained by changing the timing of the logic signals establishing the original control pattern.

The undesired direct current offset of the transformer is detected and an error signal is fed back to the thyristor controlling circuit of the inverter. Since the transformer is at a relatively high temperature, the flux of the transformer is indirectly measured. To this effect, an auxiliary reactor is used, mounted in parallel with the primary of the transformer and a Hall effect device coupled with the reactor generates a flux representative signal.

The invention relates to alternating current static generator of the harmonic neutralization type in which a plurality of inverters are coupled through transformers with a common load for reconstructing sinewaves from square-shaped voltage waves combined vectorially between the inverter stages by summing secondary windings of the transformers.

Automatic compensation of transformer offset is accomplished at any inverter stage by varying one edge of the inputted squarewave of the inverter, thereby to create an opposite offset in the transformer.

An offset correcting circuit is used, responsive to the sensed flux of the transformer for altering control of the inverter. Such offset correcting circuit specifically includes a sample and hold circuit for detecting any asymmetry in the transformer flux and for identifying the polarity of such asymmetry by correlation with logic signals controlling the inverters. A correction circuit modifies the effective timing of one logic signal in proportion to the detected asymmetry in such direction as to cause correction for the undesired asymmetry. More specifically, corrective action is obtained by introducing within the same cycle a direct current component in the transformer which is of opposite effect, thereby to prevent saturation of the transformer. More generally, the invention relates to a system for the generation of alternating current from a direct current source coupled to a transformer through positive and negative inverter switches. The invention comprises: means connected to the transformer for deriving a signal representative of the integral of the voltage developed in the transformer; first means for controlling the operation of one of said switches; second means for controlling the operation of the other of said switches; said first and second means being normally operative in an alternative and symmetrical pattern; and means responsive to said representative signal for controlling one of said first and second means to alter said pattern in time, whereby a direct current offset in the core of said transformer is minimized.

BRIEF DESCRIPTION OF THE DRAWINGS

FIG. 10 shows curves used to construct a fundamental sinusoidal output wave with the system of FIG. 9;

FIG. 11 is a table of the dimensioning transformer ratios used in the embodiment of FIG. 9;

FIG. 12 is a vectorial representation of the three phase voltage outputted by the circuit of FIG. 9;

DESCRIPTION OF THE PREFERRED EMBODIMENT

Figure 1:
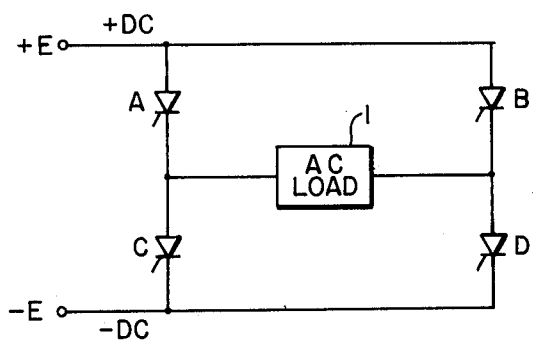
FIG. 1 is a schematic representation of an inverter coupled between a DC source and an AC load.
Figure 2:
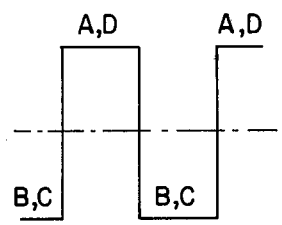
FIG. 2 typically shows as a function of time AC voltage generated by the inverter of FIG. 1.

FIG. 1 is a simplified schematic representation of an inverter circuit using thyristors A, B, C, D as power switching devices connected between the direct current terminals of a DC source having +E volts and −E volts polarities. The alternating current load 1 is alternatively traversed by energy in either direction via pairs of thyristors B, C and A, D as shown in FIG. 2 thereby to generate alternating current.

Control of the voltage at the output of the inverter is schematized by FIGS. 3A–3D and 4.

Figure 3A:
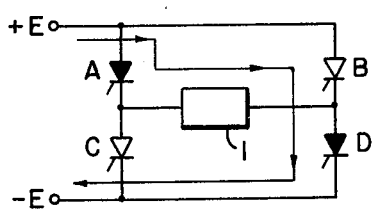
FIGS. 3A–3D illustrate the operation of the inverter of FIG. 1 for voltage control.
Figure 3B:
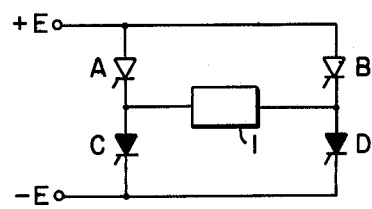
Figure 3C:
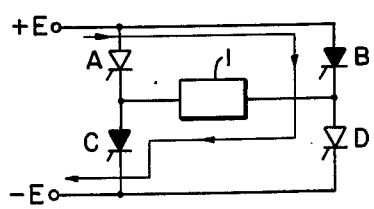
Figure 3D:
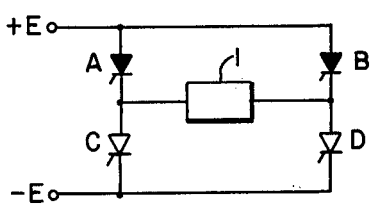
Figure 4:
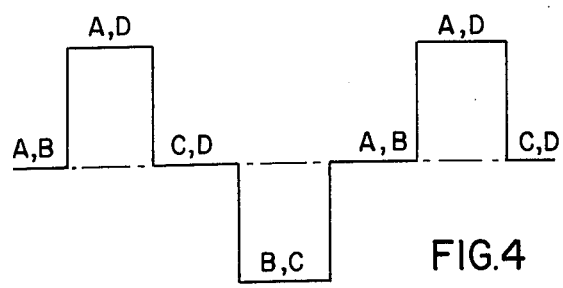
FIG. 4 is the AC voltage generated during pulse width control.

By controlling the time of conduction of thyristors A, D according to the scheme of FIGS. 3A–3D controlled times of conduction (A,D) and (B,C) are obtained representing passage of energy through the load in one and the other direction, as shown in FIG. 4. The overall waveform represents voltage across the load. FIG. 3A shows the positive half cycle (A,D). FIG. 3B illustrates zero voltage due to thyristors C and D being conducting to apply the same voltage at both ends of the load. FIG. 3C shows the negative half cycle (B,C). FIG. 3D is the zero voltage conduction due to concurrent firing of thyristors A, B. This is generally known as voltage control by adjusting pulse width.

Figure 5:
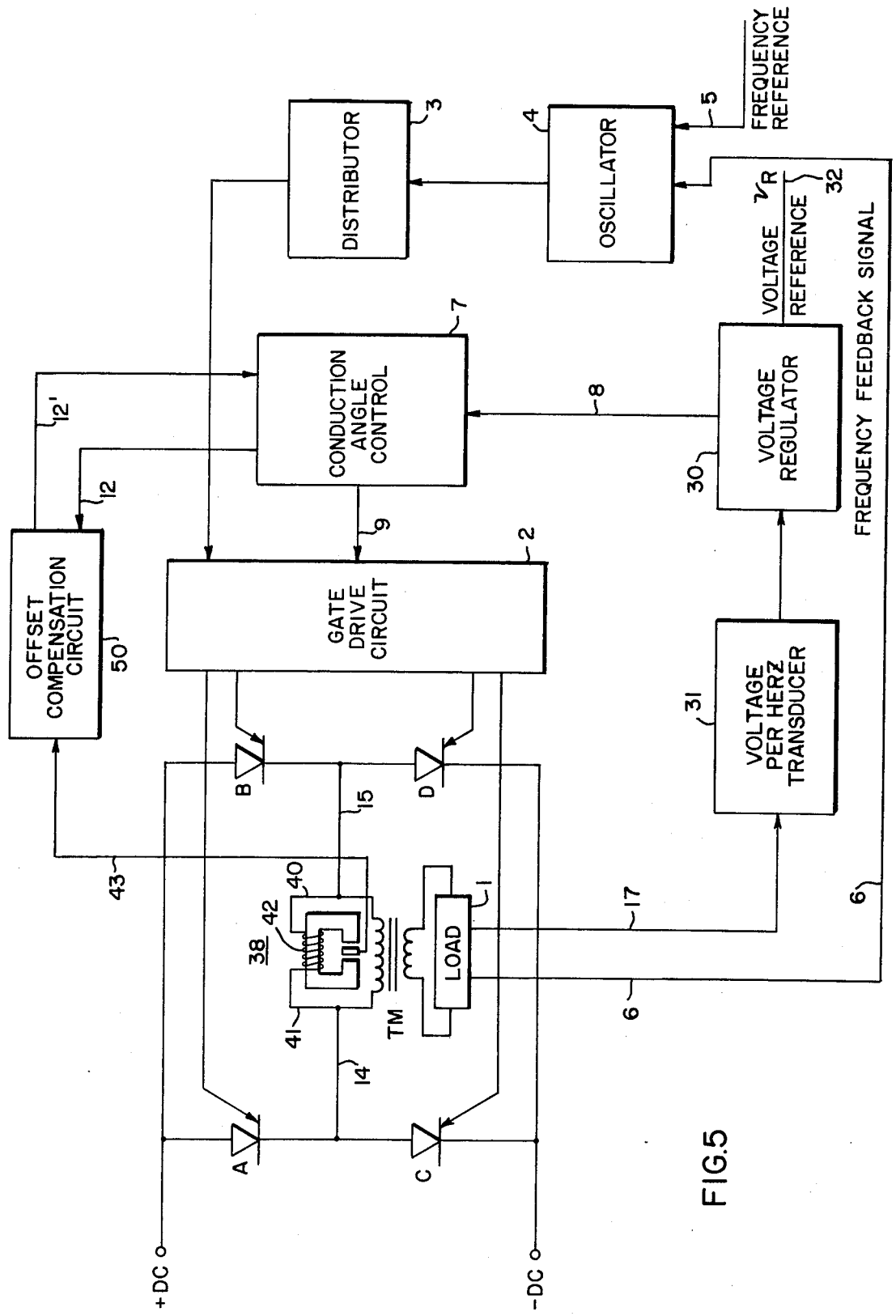
FIG. 5 is a schematic representation of the improved inverter system according to the invention.

Referring to FIG. 5, the embodiment of the invention is schematically shown as part of an inverter circuit such as the one of FIG. 1, coupled through a transformer TM to a load 1, and controlled for variable frequency of operation while being voltage regulated. Thyristors A to D are selectively, cyclically and sequentially fired by a gate drive circuit 2 in accordance with the logic of a distributor 3 having a cycle frequency defined by an oscillator 4. The frequency of the oscillator is adjusted at various settings by a frequency reference on line 5. If necessary, a frequency feedback signal derived from load 1 is applied via line 6 to the oscillator for regulation purposes. A conduction time control circuit 7 is connected to the gate drive circuit 2 in order to establish a desired pulse width of the output wave as shown by reference to FIG. 4, thereby to control the voltage across the load. A voltage regulator 30 is connected in a close voltage control loop comprising a voltage per hertz transducer 31 responsive to a feedback voltage signal derived from the load on line 17. The voltage regulator 3 generates a voltage control signal applied via line 8 to the conduction time control circuit 7.

Figure 6:
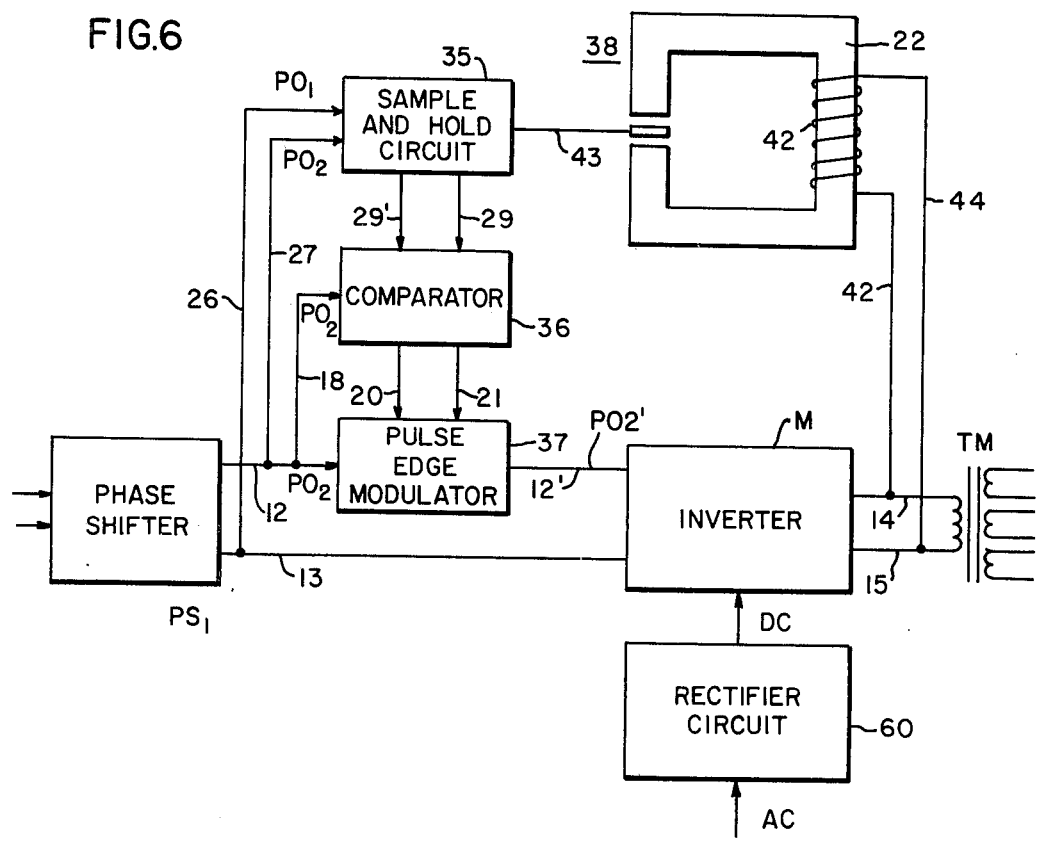
FIG. 6 is a schematic representation of the offset compensation circuit of FIG. 5.
Figure 8:
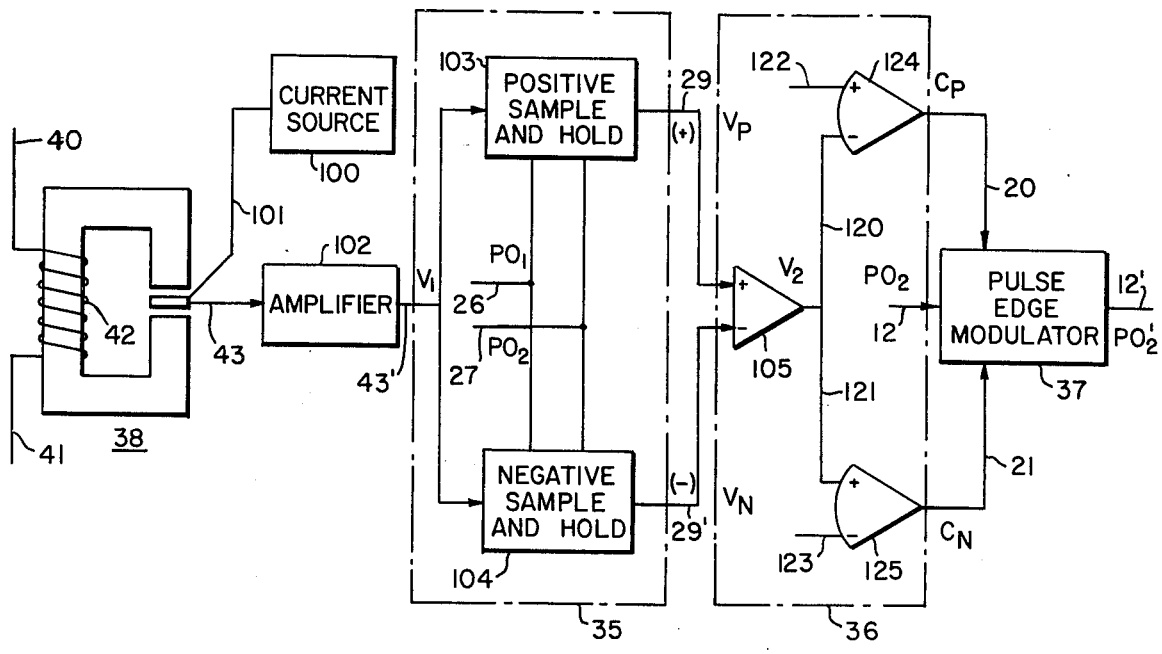
FIG. 8 shows the offset compensation circuit of FIG. 6 with more specificity.
Figure 14:
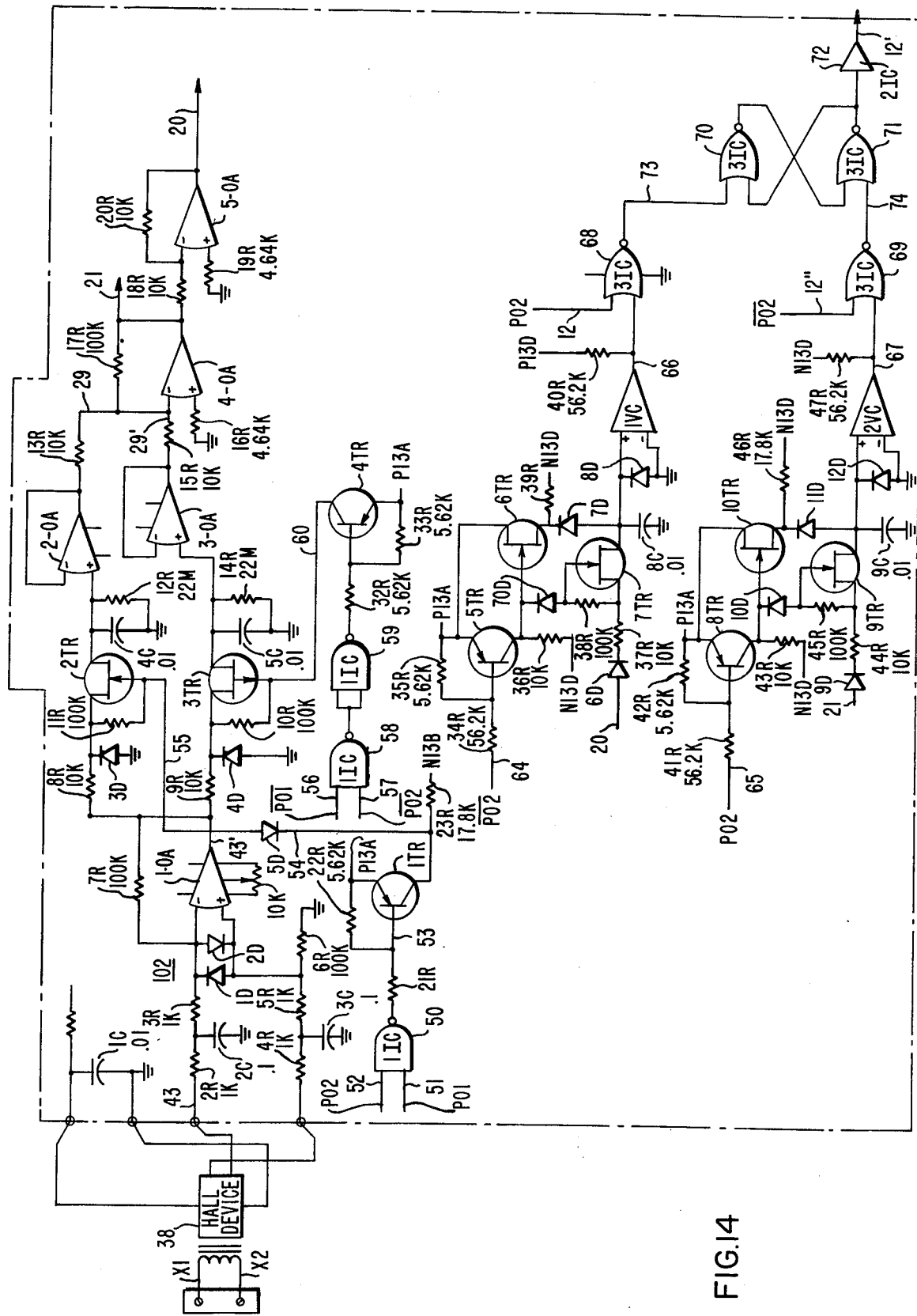
FIG. 14 provides the detailed circuitry of the offset compensation circuit of FIG. 8 in the preferred embodiment of the invention.

In order to correct any offset in the transformer TM which would cause saturation of the transformer and an overload in the inverter, in accordance with the present invention an auxiliary reactor 38 is mounted across the primary of transformer TM. The reactor winding 42 is connected via conductors 40, 41 to the output terminals of the inverter and AC output lines 14, 15. The core of the reactor possesses an air gap in which a Hall effect device is mounted, as shown. On the output line 43 from the Hall device a signal is derived representing as generally known the integral of the voltage applied to winding 42, e.g., the flux in transformer TM. An offset compensation circuit 50, described with particularity hereinafter by reference to FIGS. 6, 8 and 14, is controlled by the signal on line 43. The output of circuit 50 is applied to the conduction angle control circuit 7 which establishes a time of conduction for thyristors A, B, C, D, with the purpose of creating an asymmetry in the pattern conduction of the four thyristors. The asymmetry is of such extent as to compensate for the DC offset occurring in the transformer TM. As a result, the transformer operates under symmetrical flux conditions. To this effect, one of the logic signals controlling the conduction angle in circuit 7, is derived via line 12 and fed into the offset compensation circuit 50 from which a modified logic signal is in turn derived on line 12′ which is effectively used for controlling the conduction angle control circuit 7. Such modified conducton angle causes, via line 9 to the gate drive circuit 2, an asymmetry in the firing cycles of the inverter thyristors.

FIG. 6 is a block diagram showing the internal organization of the offset compensation circuit of FIG. 5. The circuit is connected between a phase shifter $PS_1$ and the primary of transformer TM which is at the output of an inverter system such as described in the Heinrich patent. The inverter system will be generally described hereinafter by reference to FIG. 9. Phase shifter $PS_1$ normally applies to the inverter via lines 12 and 13 a direct and a shifted logic signal, $PO_1$ and $PO_2$ (shown in FIG. 7). The edges of signals $PO_1$ and $PO_2$ establish the conduction angles of thyristors A–D and cause the inverter to derive from the DC terminals, and feed into the primary of transformer TM, an AC output wave $V_{12}$ having the shape generally shown by curve (c) of FIG. 7. As a result, in the core of the transformer the flux $\phi$ ($V_1$) follows the curve (d) of FIG. 7. The offset compensation circuit 50 of FIG. 5 is shown in FIG. 6 to include a sample and hold circuit 35, a summer circuit 36 and a pulse edge modulator 37. The sample and hold circuit 35 receives as input signal the signal derived on line 43 from the Hall effect device in reactor 38. This input signal is $\phi$ ($V_1$) represented by curve (a) on FIG. 7. The sample and hold circuit comprises two logic circuits, described hereinafter by reference to FIGS. 8 and 14, which are responsive to the direct and shifted logic signals $PO_1$, $PO_2$ from output lines 12, 13 of the phase shifter $PS_1$ via lines 26, 27, respectively. These logic circuits perform the respective logic functions ($PO_1 \cdot PO_2$) and ($\overline{PO_1} \cdot \overline{PO_2}$) which are represented by curves (e) and (f) on FIG. 7. The corresponding signals represent sampling control signals for the inputted signal of curve (d), one for the positive polarity, the other for the negative polarity. As a result, at the outputs 29, 29′, the sample and hold circuit provides sampled and held values $V_P$ and $V_N$ of the flux for either polarities. As just explained, the sample and hold circuit 35 is responsive to $PO_1$ and $PO_2$ signals controlling the inverter, and establishes an operative time interval for sampling which is defined by ($PO_1 \cdot PO_2$) for one polarity and by ($\overline{PO_1} \cdot \overline{PO_2}$) for the opposite polarity, as shown by curves (e) and (f) of FIG. 7. Thus, each sampling period occurs at a repetitive rate which is the period of the inverter operation. For each sampling period for one polarity, the sample and hold circuit 35 holds the detected value until the subsequent sampling period for the same polarity. It appears that the sample and hold circuit according to the present invention differs basically from a filtering circuit which for detection would require a low bandwidth in order to filter out the AC component of the flux and therefore would be unable to allow immediate compensation or correction for any inherent unbalance at its input. Saturation of the transformer over several cycles would not be prevented.

Figure 7:
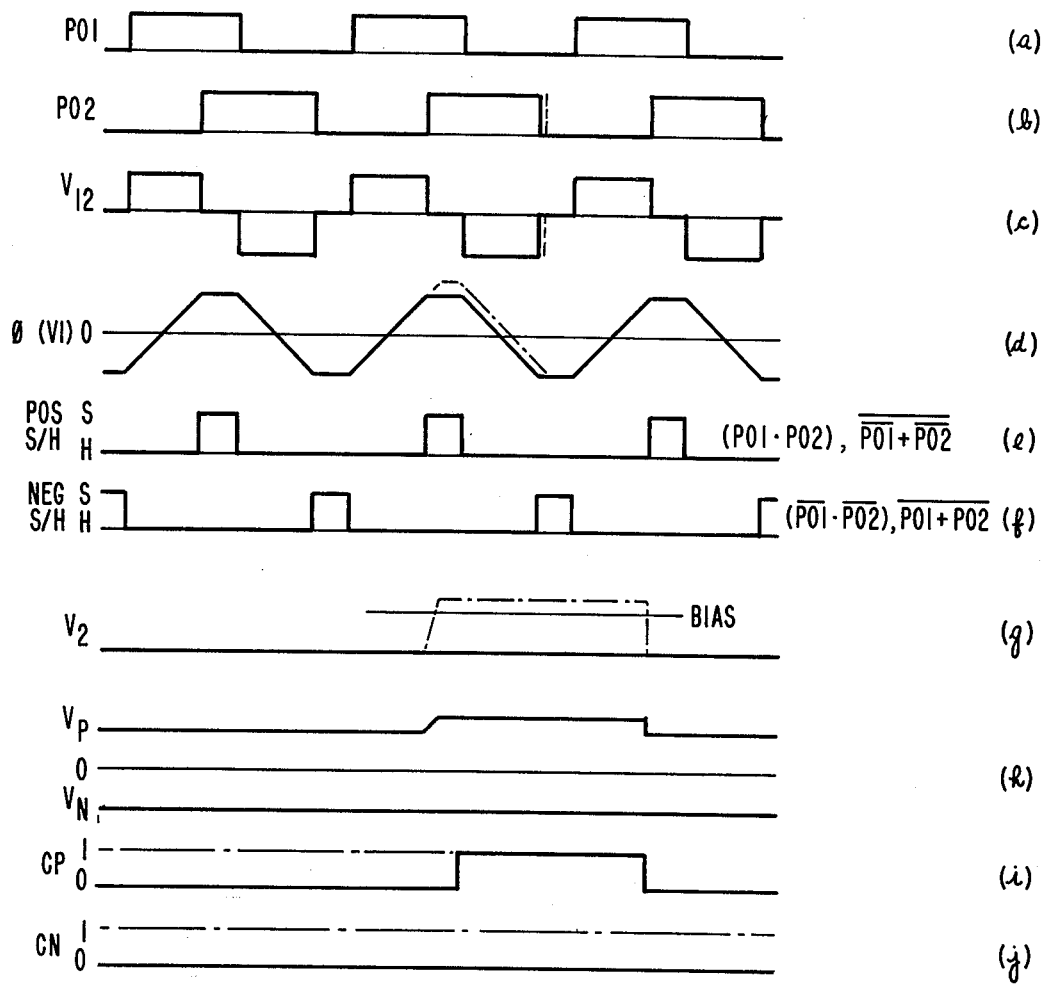
FIG. 7 provides curves and waveforms of the signals generated in the offset compensation circuit of FIG. 6.

Normally, the flux $\phi$ ($V_1$) and the output wave $V_{12}$ are symmetrical in shape and for each polarity retain the same magnitude over the cycles, as well as between polarities. If an offset occurs in the transformer, the flux is affected for instance as shown by the dotted line on the positive side of curve (d) of FIG. 7. As a result, $V_P$ on line 29 from circuit 35 exhibits a higher amplitude as shown by curve (h). After summation by summer 36, on lines 20 and 21 are derived two signals, only one at a time being effective as an error correcting signal applied upon the pulse edge modulator 37. Referring to FIG. 7, and assuming the offset to be on $\phi$ ($V_1$) as shown in dotted line, in accordance with the present invention the trailing edge of signal $PO_2$ is delayed by a proportional amount shown in dotted line on curve (b), thus causing $V_{12}$ to be distorted somewhat as shown in dotted line on curve (c). As it appears, the compensating distortion of curve $V_{12}$ generates an offset, e.g., a direct component, in the flux of the transformer core immediately following the initial or inherent offset during the same cycle, and of the opposite polarity.

In order to understand the correcting action, the offset shown in dotted line on curve $\phi$ ($V_1$) (positive peak of curve (d) of FIG. 7) can be seen as equivalent to a belated trailing edge of the positive portion of $V_{12}$ (e.g., a belated edge of $PO_2$) as well as a belated front edge of the negative portion of $V_{12}$ (e.g., a belated trailing edge of $PO_1$) during the same half-cycle corresponding to the dotted curve $\phi$ ($V_1$). Compensation for such offset is obtained in different ways.

The belated front edge of $PO_2$ (positive side of $V_{12}$) may be compensated by a belated trailing edge of $PO_2$, thus at the next peak (negative side of $V_{12}$), or the front edge of $PO_1$ (negative side of $V_{12}$) can be advanced to compensate for the belated trailing edge of $PO_1$ (of the preceding positive peak of $V_{12}$). It is also possible to work on both $PO_1$ and $PO_2$ in shared amount so as to compensate totally for the initial offset shown in dotted line on curve $\phi$ ($V_1$). Indeed, should the offset be toward the negative side, the possible correction would be in directions opposite to those just indicated for $PO_1$ and/or $PO_2$ regarding the positive side. In any case, correction occurs for the same half cycle following the unbalance, thus affecting the subsequent slope of the flux curve (d), and it operates on at least one of the two thyristor control signals $PO_1$, $PO_2$. Since signals $PO_1$ and $PO_2$ are logic signals, it is seen that shifting of the edge amounts to prolonging or shortening one of the two possible states, a ONE, or a ZERO, for a time which is proportional to the amount of the initial offset. This is performed by circuit 37 which contains the necessary time basis for delaying the ONE state, or the ZERO state, of the control signal, which for illustration is shown by FIGS. 6 and 8 to be $PO_2$. For the sake of simplification, the invention will hereinafter be described only in this context.

Referring again to FIG. 6, on lines 20 and 21 are generated signals CP and CN. When signal CP exhibits an error, correction will affect the trailing edge of $PO_2$. If CN exhibits an error, correction will affect the leading edge of $PO_2$. In the first instance correction would compensate for a positive unbalance on the flux curve, whereas in the second instance, it is a negative offset which is compensated for.

Referring to FIG. 8, circuits 35, 36 and 37 are shown with more specificity.

The Hall effect device is supplied with energy from a current source 100 via line 101. An amplifier 102 responsive to the output of the Hall device on line 43 generates a signal of sufficient amplitude $V_1$ on line 43' which is applied to the sample and hold circuit 35. Circuit 35 actually includes two sample and hold circuits 103, 104, one for each polarity. The positive sample and hold circuit 103 gated by $PO_1$ on line 26 and $PO_2$ on line 27 converts signal $V_1$ into a positive signal $V_P$ on line 29. In the same manner, the negative sample and hold circuit 104 when gated by signals $PO_1$ and $PO_2$, generates at the output, on line 29', a negative signal $V_N$. These two signals $V_P$, $V_N$ are algebraically summed up by summing amplifier 105 to provide signal $V_2$. Curve (h) of FIG. 7 represents outputs $V_P$ and $V_N$, while curve (g) provides the summer output $V_2$. Summer 36 also includes operational amplifiers 124, 125 responsive on lines 120, 121 to signal $V_2$. If an error signal is generated, it appears at the output on lines 20 or 21 in time concurrence with the polarity of $PO_2$. Since curve (d) shows an offset for the positive side, the error will appear as $V_P$ on line 20, and none will be detected as $V_N$ on line 21. The reference signals on line 122, 123 are biased at 10% so that no error signal will be generated at the output if $V_2$ is less than 10% of its maximum value. Operational amplifiers 124 and 125 within summer 36 are responsive to $V_2$. $V_2$ is supplied via line 120 to the negative input of operational amplifier 124 and is supplied via line 121 to the positive input of operational amplifier 125. The second input of each operational amplifier is supplied at 122, 123, respectively with a reference signal of opposite polarity representing a threshold of 10% of the maximum $V_2$ voltage. Therefore, an error $V_2$ existing on line 120, or 121, when $PO_2$ is being received on line 12 by the pulse edge modulator, will cause $PO_2'$ to take from line 20, or 21, the opposite state than $PO_2$ would then receive on line 12. As a result, if $PO_2$ goes to the ZERO state, it will appears as a ONE from line 21, thus delaying in fact the trailing edge of $PO_2$ as seen from the transformer. If at the moment, $PO_2$ is transferring to the ONE state, there is an error $V_2$ on line 120, the state of $PO_2$ would still appear as a ZERO state on line 121 for as long as the error on line 121 demands. Thus the front edge of $PO_2$ would have, in fact, been delayed by that much as seen from the inverter.

The nature and operational mode of circuits 35, 36 and 37 will appear more clearly from a consideration of FIG. 14 as explained hereinafter.

Figure 9:
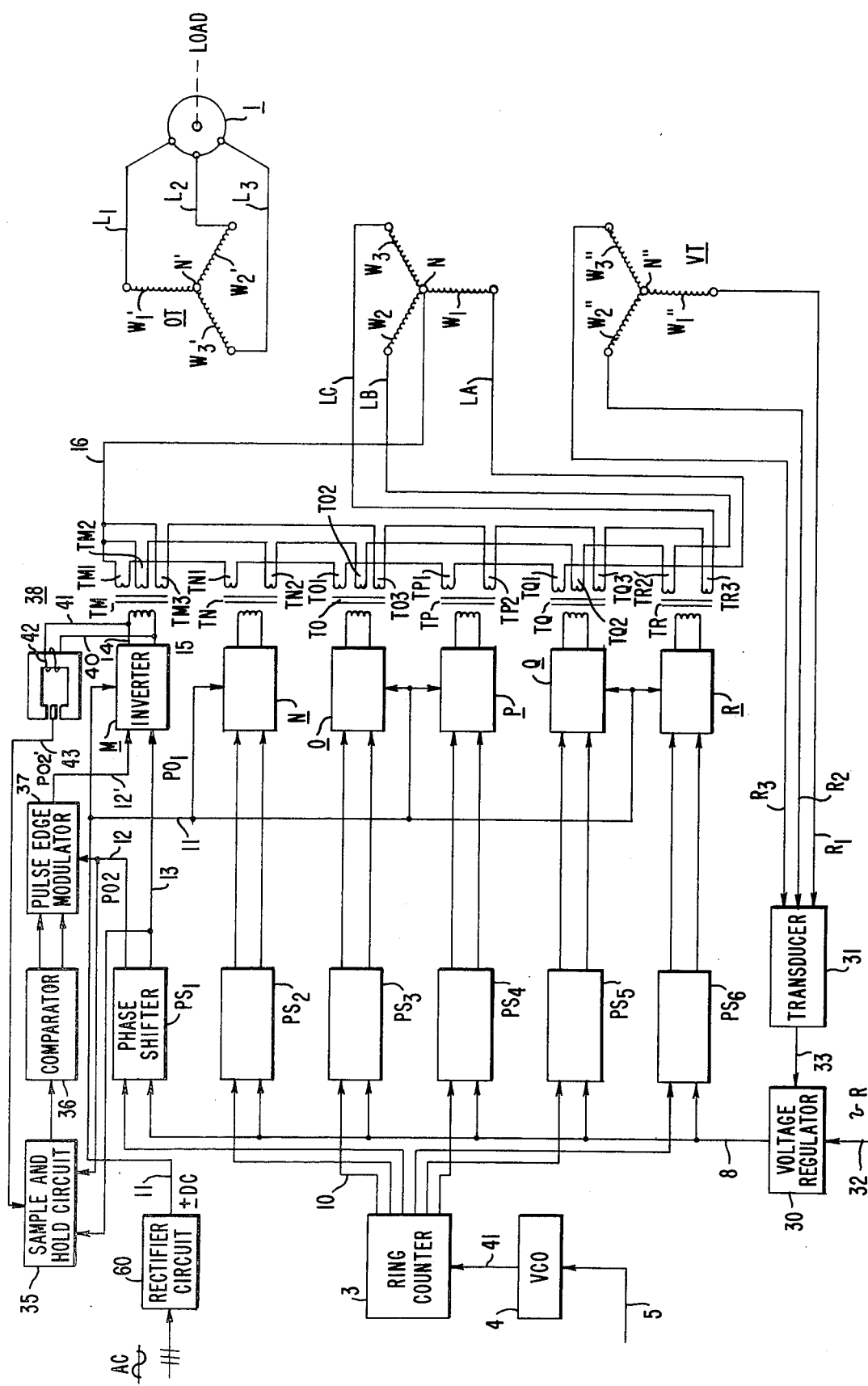
FIG. 9 illustrates the invention in the context of an harmonic neutralization converter system.
Figure 13:
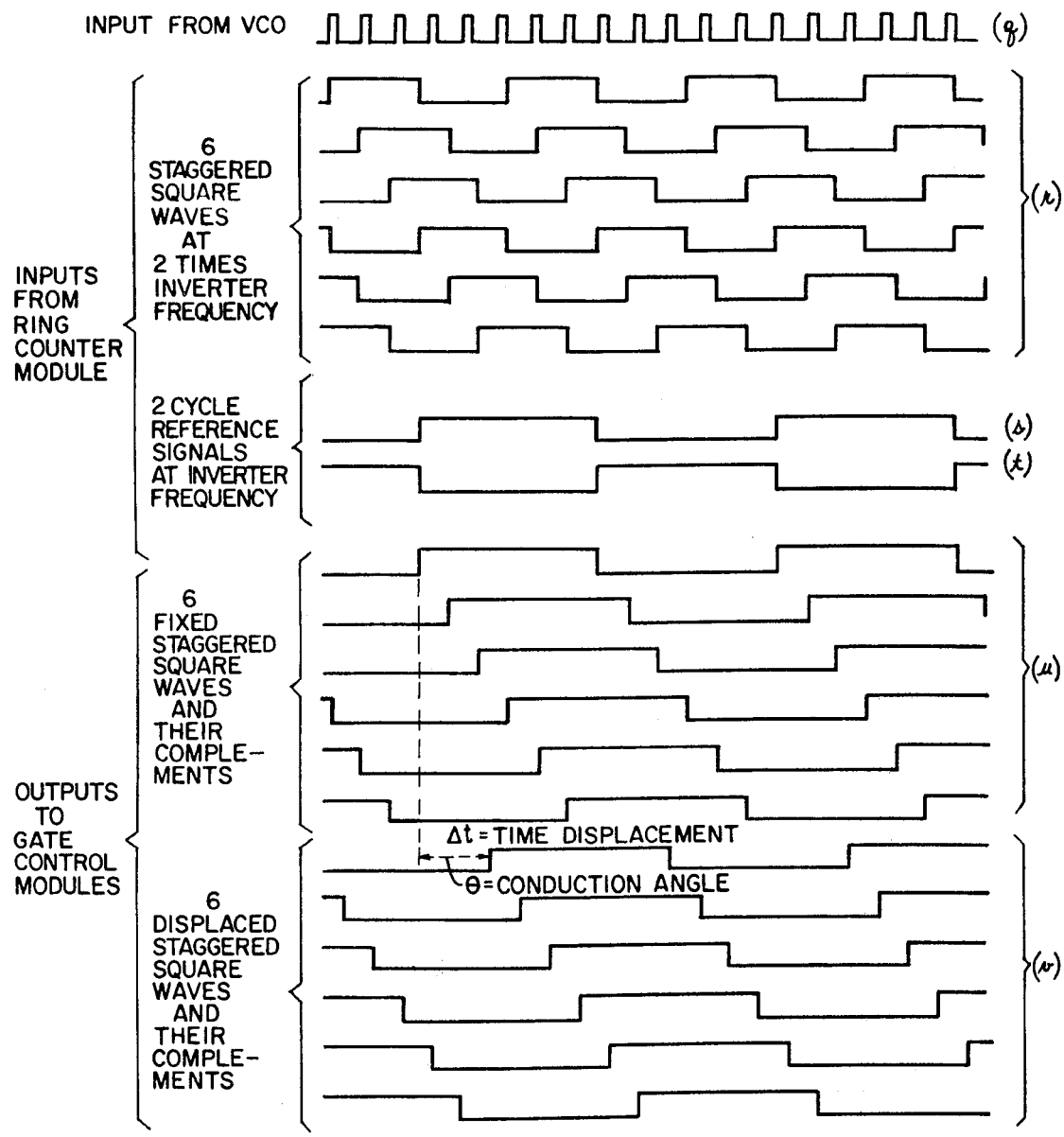
FIG. 13 shows squarewaves operating on the ring counter and the phase shifters of FIG. 9 to generate the output waves of FIG. 10.

Referring to the drawings, FIG. 9 is a schematic block diagram of a DC to AC converter of the type disclosed in the aforementioned U.S. Pat. No. 3,491,282 of T. M. Heinrich et al., embodying voltage control in accordance with the present invention.

Typically, the DC to AC converter of FIG. 9 uses six inverter stages M–R for harmonic neutralization. Each inverter is supplied via line 11 with direct current voltage derived from a rectifier circuit 60 converting the 60 hertz AC power supply into direct current voltage. The inverters are sequentially and cyclically controlled by output signals on lines 12, 13 from respective phase shifters $PS_1$, $PS_2$, $PS_3$, $PS_4$, $PS_5$ and $PS_6$, which are also sequentially and cyclically activated by a ring counter 3 outputting triggering control signals in a multiplex fashion via lines 10. The ring counter 3 serves as a distributor for the phase shifters $PS_1$–$PS_6$, and, indirectly, for the inverters M-R. The frequency of the ring counter is determined by a voltage controlled oscillator (VCO) 4 applying a frequency control signal on line 41 thereto.

In accordance with the teachings of the Heinrich Patent, inverters M-R generate at their respective outputs 14, 15 identical square pulses which are shifted by a phase angle the same between each stage. For the purpose of this disclosure the description of the U.S. Pat. No. 3,491,282 of T. M. Heinrich is incorporated by reference therein. As disclosed in the Heinrich patent, the squarewaves generated between lines 14, 15 are amplified by respective transformers (TM–TR). The dimensioning ratios of the transformers follow a cosine law from one stage to the next and the secondary windings of the transformers are combined in series so as to sum the dimensioned squarewaves and form a sinewave shown like the one at (f) in FIG. 7 for phase A and output line $L_A$.

The output voltage on lines $L_A$, $L_B$, $L_C$ depends on the width of the individual square pulses which, as shown in FIG. 7 for phase A, build up the fundamental sinewave. Voltage control has been described in the aforementioned United States Patent of Heinrich, and in the paper entitled "Static Inverter With Neutralization Of Harmonics" by A. Kernick, J. L. Roof and T. M. Heinrich presented at the AIEEE Aero-Space Transportation Conference in Philadelphia, June 26–30, 1961.

While voltage control has been disclosed in the patent either by pulse width modulation or by phase shift modulation, FIG. 6 illustrates an embodiment of the invention with phase shift modulation. Voltage transformer VT provides between the secondary windings $W_1''$, $W_2''$, $W_3''$ and lines $R_1$, $R_2$, $R_3$ voltage feedback signals which are applied to a voltage regulator 30 in order to adjust the output voltage on lines $L_A$, $L_B$, $L_C$ in relation to a reference voltage $V_R$ also applied to the voltage regulator 30.

The ring counter circuit 3 determines the firing sequence of thyristors conventionally connected in the DC link as part of inverters M-R. The conduction pattern determines the output waveforms. The signal input on line 41 is a train of pulses from the VCO, as shown by curve (g) in FIG. 10. The output signals on multiplex lines 10 consist of 6 symmetrical squarewaves, at 1/6 the input pulse frequency, phase staggered to each other by a fixed phase angle II. Phase shifters $PS_1$–$PS_6$ employ the "time phase" logic 3 to control the duration of application of the voltage to the load in each power stage.

Referring to FIG. 14, the Hall device 38 provides on line 43 an input signal to operational amplifier 1-OA which is representative of curve $\phi$ ($V_1$) of FIG. 7. Amplifier 1-OA acts as a buffer and provides at output 43′ an amplified signal, the gain being for instance 50. As schematically shown in FIG. 8, signal $V_1$ of line 43′ is applied as input to positive and negative sample and hold circuits, 103 and 104. The positive sample and hold circuit is shown in FIG. 14 to include from line 43′ an FET device 2TR, a charging capacitor 4C connected at the positive input of an operational amplifier 2-OA of unity gain itself connected as a voltage follower for outputting signal $V_P$ on line 29 to a summer comprised of operational amplifier 4-OA. The sampling function is performed by the circuit gating the FET device 2TR. The latter includes a NAND device 50 responsive to signals $PO_1$ and $PO_2$ on respective lines 51, 52. Thus, device 50 performs the logic function ($PO_1 \cdot PO_2$) earlier mentioned by reference to curve (e) of FIG. 7. When $PO_1$ and $PO_2$ are both a ONE, which means that the positive peak of $\phi$ ($V_1$) is being sampled, transistor 1TR is conducting, thereby to switch via line 54 the potential on the cathode electrode of diode 50 from +13 volts to −13 volts and apply to the base of 2TR via line 55 a voltage rendering 2TR conducting. When this occurs, $V_1$ on line 43′ charges capacitor 4C which holds the stored charge and maintains an input voltage from one positive peak of $\phi$ ($V_1$) to the next. If, as shown in dotted line $\phi$ ($V_1$) exhibits a DC component, the voltage $V_P$ on line 29 at the output of 2-OA will exhibit an increase as shown by curve (h) of FIG. 7.

The negative sample and hold circuit is similar. It includes a NAND device 58 responsive to $\overline{PO_1}$ and $\overline{PO_2}$ to perform the function ($\overline{PO_1} \cdot \overline{PO_2}$) with a subsequent inversion by NAND device 59 to generate a signal represented by curve (f) of FIG. 7. An FET device 3TR controlled by a transistor 4TR applying the required bias samples $V_1$ from line 43′ for each negative peak of $\phi$ ($V_1$) and charges capacitor 5C at the input of operational amplifier 3-OA to hold the value of $V_1$ and generate on line 29′ the voltage $V_N$ shown by curve (h) of FIG. 7. Thus voltage $V_N$ is also applied to the negative input of summer amplifier 4-OA. Operational amplifier 4-OA is followed by an inverting amplifier 5-OA. Thus, at the output of 4-OA on line 21 is derived voltage CN of curve (j) of FIG. 7 while at the output of 5-OA on line 20 is derived signal CP of curve (i) of FIG. 7. The signal CP on line 20 represents an error whenever, as shown in FIG. 7, the positive peak of the flux carries a DC component as shown in dotted line. Conversely, CN on line 21 would exhibit an error whenever the offset is on the negative peak of the flux.

In accordance with the present invention, whenever an error occurs, for instance as CP, the trailing edge of signal $PO_2$ is caused to be delayed by the amount of the error CP. In other words, as shown in dotted line on curves (b) and (c) of FIG. 7, an unbalance is caused to appear as inputted by the inverter into the transformer on the opposite side of the flux and for the same period. Thus, $V_{12}$ exhibits a compensating distortion which combines with the inherent offset to prevent saturation of the core of the transformer during the cycle. Circuit 37 for altering the timing of the trailing edge of signal PO from line 12 in proportion to the error CP on line 20 will now be described by reference to FIG. 14. It is observed at this point that, should the error appear as CN instead of CP, thus on the negative side, circuit 37 operates on the leading edge of $PO_2$ for the next peak, e.g., the positive peak, will be delayed by the same amount as the error, to cause an unbalance compensating for the offset in the coil of the transformer. For this reason, the signal on line 20 is called correction on the ONE state of $PO_2$, while on line 21 is derived the correction on the zero state of $PO_2$.

Considering the trailing edge correction from line 20 at the output of 5-OA, signal CP is applied to a biasing diode 6D, acting as a limiter establishing a threshold for the error to be effective. This limiter action is equivalent to the 10% bias applied on devices 124, 125 of FIG. 8. After the threshold has been overcome, the error $V_1$ is applied through an FET device 7TR to a time basis comprising resistor 19R, reverse diode 7D and capacitor 8C. Capacitor 8C is charged via FET device 7TR in proportion to the extent of the offset represented by the error on line 20. The discharge is caused to occur with a time constant due to discharge via diode 7D whenever signal $\overline{PO_2}$ on line 64 becomes a ONE, and causes transistor 5TR and FET device 6TR to conduct. $\overline{PO_2}$ translates a change of state of $PO_2$ from a ONE to a ZERO with concurrent turning ON of 5TR, 6TR which occurrence coincides with the trailing edge of $PO_2$ on line 12. Voltage comparator 1VC maintains its output on line 66 as ONE for a time interval which is proportional to the aforementioned time constant and to the initial voltage on capacitor 8C due to the offset or error on line 20. A NOR device 68 responsive to line 66 and line 12 causes the modified signal $PO_2$ to appear on line 73. In the same fashion, should correction on the leading edge be required, thus for a negative peak effect in $\phi$ ($V_1$), an error CN (not shown) on line 21 will charge a capacitor 9C via an FET device 9TR to maintain the logic zero of $PO_2$ on line 65 via transistors 8TR and 10TR for a proportional duration at the input of voltage comparator 2VC. Then, on line 67 a ONE will be applied to NOR device 69 after $\overline{PO_2}$, on line 12″, has exhibited the equivalent of the $PO_2$ leading edge. Thus, on line 74 a zero is maintained past the normal leading edge of $PO_2$ for a duration defined by the time constant at the input of 2VC, namely resistor 46R and capacitor 9C and the initial voltage on capacitor 9C due to the offset or error. A flip-flop comprised of NOR devices 70, 71 is set from line 73 (trailing edge correction) and reset from line 74 (leading edge correction). After inversion through inverter 72, signal $PO_2'$, representing the corrected logic signal, is derived and applied as shifted signal to the inverter associated with transformer TM.

Indeed, the offset correction circuit according to the present invention may be used for each stage inverter of the system of FIG. 9.

What is claimed is:

1. In a system for the generation of alternating current from a direct current power source coupled to a transformer through positive and negative inverter switches, the combination of:

means connected to said transformer for deriving a signal representative of the integral of the voltage developed in said transformer;

first means for controlling the operation of at least a selected one of said switches, second means for controlling the operation of at least another selected one of said switches, said first and second controlling means being normally operative in an alternative and balanced pattern between two polarity poles; and means synchronized with said first and second controlling means responsive to said representative signal for detecting a flux imbalance toward one polarity pole in said transformer and for controlling one of said first and second controlling means to alter said pattern within a cycle thereof, whereby said flux imbalance is minimized.

2. The system of claim 1 with said synchronized means including sample and hold means operative in a sample mode in time concurrence with said first and second controlling means, and in a hold mode during the rest of the half-cycle of said first and second controlling means.

3. The system of claim 1 with said first and second controlling means including first and second identical logic square pulse trains having a phase difference therebetween defining said pattern; said representative signal responsive means being adapted to change a selected pulse edge in one of said pulse trains in relation to the opposite polarity pole immediately following said flux unbalance toward one polarity pole during the same cycle.

4. The system of claim 3 with said representative signal responsive means including a time basis affected to said one polarity pole unbalance for temporarily storing a logic state with time constant in relation to the magnitude of said representative signal; gating means responsive to said one pulse train and to said stored logic state for generating an effective pulse train having one of the leading and trailing pulse edges modified by said stored logic state.

5. The system of claim 4 with said representative signal responsive means including a second time basis affected to an unbalance toward the opposite polarity pole, for temporarily storing the opposite logic state with a time constant in relation to the magnitude of the representative signal corresponding to said opposite polarity pole unbalance; second gating means responsive to said one pulse train and to said stored opposite logic state for generating said effective pulse train with the other of the leading and trailing pulse edges modified by said stored opposite logic state.

* * * * *